United States Patent [19]

Dickens, Jr.

[11] 3,968,064
[45] July 6, 1976

[54] SMOKE RETARDANT VINYL CHLORIDE AND VINYLIDENE CHLORIDE POLYMER COMPOSITIONS

[75] Inventor: Elmer Douglas Dickens, Jr., Richfield, Ohio

[73] Assignee: The B. F. Goodrich Company, Akron, Ohio

[22] Filed: Jan. 15, 1976

[21] Appl. No.: 649,501

[52] U.S. Cl. ............ 260/23 XA; 260/45.75 R; 260/45.75 N; 260/45.75 D
[51] Int. Cl.² ............................................ C08J 3/20
[58] Field of Search ........... 260/45.75 N, 45.75 R, 260/23 XA

[56] References Cited
UNITED STATES PATENTS

| | | | |
|---|---|---|---|
| 3,870,679 | 3/1975 | Mitchell et al. | 260/45.75 R |
| 3,878,167 | 4/1975 | Kroenke | 260/45.75 R |
| 3,883,482 | 5/1975 | Kroenke | 260/45.75 R |
| 3,900,441 | 8/1975 | King | 260/45.75 R |
| 3,903,028 | 9/1975 | Mitchell | 260/45.75 R |
| 3,914,201 | 10/1975 | Kroenke | 260/45.75 R |
| 3,929,722 | 12/1975 | Bak et al. | 260/45.75 R |

*Primary Examiner*—V.P. Hoke
*Attorney, Agent, or Firm*—Charles A. Crehore

[57] ABSTRACT

Smoke retardant vinyl chloride and vinylidene chloride polymer compositions are obtained by including therein a synergistic mixture of (A) at least one nickel compound selected from the group consisting of $NiCO_3$, $NiO$, $Ni_2Si$, $NiS$, and nickel stearate, and (B) at least one vanadium compound selected from the group consisting of $NH_4VO_3$, $Mg(VO_3)_2$, $NaVO_3$, $VOSO_4$, $V_2O_4$, $V_2O_5$, and vanadium oxyacetylacetonate. Substantial smoke retardation is also obtained by including the above nickel compounds or vanadium compounds individually in the vinyl chloride or vinylidene chloride polymer compositions. Hydrates of the additive compounds may also be used.

23 Claims, No Drawings

SMOKE RETARDANT VINYL CHLORIDE AND VINYLIDENE CHLORIDE POLYMER COMPOSITIONS

BACKGROUND OF THE INVENTION

Vinyl chloride and vinylidene chloride polymers are known to be self-extinguishing and relatively more flame retardant than other polymers such as polyethylene, polypropylene and the like. However, a substantial amount of smoke may be produced upon exposure of vinyl chloride and vinylidene chloride polymers to a flame. The fact that an additive is a flame retardant does not necessarily mean that it will have good smoke retardant properties, as is well known to those skilled in the art. U.S. Pat. No. 3,846,372 teaches some vanadium compounds as smoke retardants in polyvinyl halides. New smoke retardant vinyl chloride and vinylidene chloride polymer compositions are desired.

SUMMARY OF THE INVENTION

Smoke retardant vinyl chloride and vinylidene chloride polymer compositions are obtained by including therein a synergistic mixture of (A) at least one nickel compound selected from the group consisting of $NiCO_3$, NiO, $Ni_2Si$, NiS, and nickel stearate, and (B) at least one vanadium compound selected from the group consisting of $NH_4VO_3$, $Mg(VO_3)_2$, $NaVO_3$, $VOSO_4$, $V_2O_4$, $V_2O_5$, and vanadium oxyacetylacetonate. Substantial smoke retardation is also obtained by including at least one of these vanadium compounds in the vinyl chloride or vinylidene chloride polymer compositions: $NH_4VO_3$, $Mg(VO_3)_2$, $NaVO_3$ or vanadium oxyacetylacetonate. Hydrates of the additive compounds may also be used.

DETAILED DESCRIPTION

The present invention encompasses vinyl chloride and vinylidene chloride polymer compositions containing therein synergistic mixtures of (A) at least one nickel compound selected from the group consisting of $NiCO_3$, NiO, $Ni_2Si$, NiS, and nickel stearate, and (B) at least one vanadium compound selected from the group consisting of $NH_4VO_3$, $Mg(VO_3)_2$, $NaVO_3$, $VOSO_4$, $V_2O_4$, $V_2O_5$ and vanadium oxyacetylacetonate. More preferred smoke retardant synergistic mixtures include (A) NiO and (B) at least one vanadium compound selected from the group consisting of $NH_4VO_3$, $NaVO_3$, $V_2O_4$, $V_2O_5$, and vanadium oxyacetylacetonate. The following individual vanadium compounds are believed to be novel additives in vinyl chloride and vinylidene chloride polymer compositions and are effective smoke retardants: $NH_4VO_3$, $Mg(VO_3)_2$, $NaVO_3$, vanadium oxyacetylacetonate and mixtures thereof. Hydrates of the synergistic compounds or individual vanadium compounds may also be used, for example $VOSO_4 \cdot 2H_2O$.

The additive nickel and vanadium compounds used in this invention may be polycrystalline or amorphous fine powders, preferably with an average particle size from about 0.01 to about 800 microns, more preferably from about 0.1 to about 200 microns, and even more preferably from about 0.5 to about 150 microns. Polymer compositions containing the additives may have colors similar to, although somewhat lighter than, the additives themselves. The additive compounds may be used in total amounts from about 0.01 to about 20 parts by weight, more preferably from about 1 to about 10 parts by weight, per 100 parts by weight of polymer. Use of more than about 20 parts by weight of additive per 100 parts by weight of polymer may affect adversely other important physical properties, such as tensile strength and the like. The amount of each additive may constitute from about 1% to about 99% by weight, more preferably from about 10% to about 90% by weight, of the additive compound mixture. Supporting media such as $SiO_2$ and other substantially inert inorganic supporting materials known in the art may be used for the smoke retardant additives and in many cases are preferred, since additive surface area is greatly increased for smoke reduction purposes.

Not all nickel compound/vanadium compound mixtures are synergistic, and it is difficult or impossible to predict synergism. Mixtures found to be nonsynergistic using the Goodrich Smoke-Char Test described hereinafter include $Ni(BO_2)_2$ and $Ca_2V_2O_7$, $NiI_2$ and $V_2O_5$, $NiMoO_4 \cdot H_2O$ and $V_2O_5$, NiO and $Ca_2V_2O_7$, NiO and $Na_3VO_4 \cdot 16H_2O$, NiO and vanadium metal, NiO and $VB_2$, and NiO and $V_2O_3$. Other nonsynergistic combinations include $Ni_2O_3$ and $V_2O_4$, $Ni_2O_3$ and $V_2O_5$, $Ni_2Si$ and $VB_2$, $Ni_2Si$ and VN, $NiSnO_3$ and VN, $NiSO_4$ and $NH_4VO_3$, $NiSO_4$ and $VOSO_4 \cdot 2H_2O$, nickel acetylacetonate and vanadium oxyacetylacetonate, and nickel citrate and $LaVO_4$. Moreover, vanadium metal used alone was found to increase smoke formation in polyvinyl chloride compositions. Thus it was surprising and unexpected to find smoke reduction using the specific nickel compound/vanadium compound mixtures of this invention.

Vinyl chloride and vinylidene chloride polymers used in this invention include homopolymers, copolymers and blends of homopolymers and/or copolymers. The vinyl chloride and vinylidene chloride polymers may contain from 0 up to about 50% by weight of at least one other olefinically unsaturated monomer, more preferably at least one other vinylidene monomer (i.e., a monomer containing at least one terminal $CH_2=C<$ group per molecule) copolymerized therewith, even more preferably up to about 20% by weight of such monomer. Suitable monomers include 1-olefins containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene, and the like; ethylidene norbornene and dicyclopentadiene; vinyl esters and allyl esters such as vinyl acetate, vinyl chloroacetate, vinyl propionate, vinyl laurate, allyl acetate and the like; vinyl aromatics such as styrene, α-methylstyrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-, β- and γ- cyanopropyl acrylates and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like, and including esters of maleic and fumaric acid and the like; amides of the α,β-olefinically unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis(β-haloalkyl) alkenyl phosphonates such as bis(β-chloroethyl) vinyl phosphonate and the like.

More preferred monomers include 1-olefins containing from 2 to 12 carbon atoms, more preferably from 2 to 8 carbon atoms, such as ethylene, propylene, 1-butene, isobutylene, 1-hexene, 4-methyl-1-pentene and the like; vinyl esters and allyl esters such as vinyl acetate, vinyl chloracetate, vinyl propionate, vinyl laurate, allyl acetate and the like; olefinically unsaturated carboxylic acids and esters thereeof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioacrylate, methyl methacrylate and the like, and including esters of maleic and fumaric acid and the like; and amides of α,β-olefinically unsaturated carboxylic acids such as acrylamide and the like.

The vinyl chloride and vinylidene chloride polymers may be prepared by any method known to the art such as by emulsion, suspension, bulk or solution polymerization. The additive compounds may be mixed with the polymer emulsion, suspension, solution or bulk mass before monomer recover and/or drying. More preferably the compounds may be mixed with dry granular or powdered polymers. The polymer and compounds may be mixed thoroughly in granular or powder form in apparatus such as a Henschel mixer or the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compounds but will generally be in the range of about 300° to 400°F. and 2 to 10 minutes.

Smoke retardancy may be measured using a NBS Smoke Chamber according to procedures described by Gross et al, "Method for Measuring Smoke from Burning Materials", *Symposium on Fire Test Methods — Restraint 」 Smoke* 1966, ASTM STP 422, pp. 166–204. Maximum smoke density ($D_m$) is a dimensionless number and has the advantage of representing a smoke density independent of chamber volume, specimen size or photometer path length, provided a consistent dimensional system is used. Maximum rate of smoke generation ($R_m$) is defined in units of $min.^{-1}$. Percent smoke reduction is calculated using this equation:

$$\frac{D_m/g \text{ of sample} - D_m/g \text{ of control}}{D_m/g \text{ of control}} \times 100.$$

The term $D_m/g$ means maximum smoke density per gram of sample. $D_m$ and other aspects of the physical optics of light transmission through smoke are discussed fully in the above ASTM publication.

Smoke retardance may be measured quickly using the Goodrich Smoke-Char Test. Test samples may be prepared by dry blending polymer resin and smoke retardant additives. The blend is ground in a liquid $N_2$-cooled grinder to assure uniform dispersion of the smoke retardant additives in the resin. Small (about 0.3g) samples of the polymer blend are pressed into pellets about ¼ inch in diameter for testing. Alternatively, test samples may be prepared by blending resin, smoke retardant additives and lubricant(s) or processing aid(s) in a blender such as an Osterizer blender. The blend is milled, pressed into sheets, and cut into small (about 0.3 gram) samples for testing. The test samples are placed on a screen and burned for 60 seconds with a propane gas flame rising vertically from beneath the sample. Sample geometry at a constant weight has been found not to be significant for the small samples used in this test. A Bernz-O-Matic pencil flame burner head is used with gas pressure maintained at 40 psig. The sample is immersed totally and continuously in the flame. Smoke from the burning sample rises in a vertical chimney and passes through the light beam of a Model 407 Precision Wideband Photometer (Grace Electronics, Inc., Cleveland, Ohio) coupled with a photometer integrator. Smoke generation is measured as integrated area per gram of sample.

The vinyl chloride and vinylidene chloride polymer compositions of this invention may contain the usual compounding ingredients known to the art such as fillers, stabilizers, opacifiers, lubricants, processing aids, impact modifying resins, plasticizers, antioxidants and the like.

The following examples illustrate the present invention more fully.

EXAMPLE 1–11

The following recipe was used:

| MATERIAL | PARTS |
|---|---|
| Polyvinyl chloride* | 100 |
| Additive (A)** | variable |
| Additive (B)*** | variable |

*Homopolymer having an inherent viscosity of about 0.92–0.99, ASTM Classification GP-4-15443.
**Nickel compound selected from the group consisting of $NiCO_3$, NiO, $Ni_2Si$, NiS, and nickel stearate. The control sample contained no additive.
***Vanadium compound selected from the group consisting of $NH_4VO_3$, $Mg(VO_3)_2$, $NaVO_3$, $VOSO_4\cdot 2H_2O$, $V_2O_5$, $V_2O_3$, and vanadium oxyacetylacetonate. The control sample contained no additive.

Each experimental sample was prepared by blending resin and additives in a liquid $N_2$-cooled grinder to assure uniform dispersion of the smoke retardant additives in the resin. Small (about 0.3 gram) samples of the polymer blend were pressed into pellets about ¼ inch in diameter and tested using the Goodrich Smoke-Char Test described heretofore. Test results are given in Table I.

TABLE I

| Example | Additive (A) (phr) | Additive (B) (phr) | Smoke Formation Per Gram of Sample | Smoke Reduction(%) |
|---|---|---|---|---|
| Control | None | None | 67.4 | |
| 1 | $NiCO_3$ (10) | | 36.1 | 46 |

TABLE 1-continued

| Example | Additive (A) (phr) | Additive (B) (phr) | Smoke Formation Per Gram of Sample | Smoke Reduction (%) |
|---|---|---|---|---|
|   |   | $V_2O_4$ (10) | 26.0 | 61 |
|   | $NiCO_3$ (5) | $V_2O_4$ (5) | 17.6 | 74 |
| 2 | NiO (10) |   | 23.4 | 65 |
|   |   | $NH_4VO_3$ (10) | 30.1 | 55 |
|   | NiO (5) | $NH_4VO_3$ (5) | 14.3 | 79 |
| 3 | NiO (10) |   | 23.4 | 65 |
|   |   | $Mg(VO_3)_2$ (10) | 30.9 | 54 |
|   | NiO (5) | $Mg(VO_3)_2$ (5) | 19.9 | 70 |
| 4 | NiO (10) |   | 23.4 | 65 |
|   |   | $NaVO_3$ (10) | 38.1 | 43 |
|   | NiO (5) | $NaVO_3$ (5) | 13.9 | 79 |
| 5 | NiO (10) |   | 23.4 | 65 |
|   |   | $VOSO_4·2H_2O$ (10) | 27.2 | 60 |
|   | NiO (5) | $VOSO_4·2H_2O$ (5) | 20.9 | 69 |
| 6 | NiO (10) |   | 23.4 | 65 |
|   |   | $V_2O_4$ (10) | 26.0 | 61 |
|   | NiO (5) | $V_2O_4$ (5) | 15.7 | 77 |
| 7 | NiO (10) |   | 23.4 | 65 |
|   |   | $V_2O_5$ (10) | 23.7 | 65 |
|   | NiO (5) | $V_2O_5$ (5) | 13.3 | 80 |
| 8 | NiO (10) |   | 23.4 | 65 |
|   |   | Vanadium Oxyacetylacetonate (10) | 26.6 | 61 |
|   | NiO (5) | Vanadium Oxyacetylacetonate (5) | 15.4 | 77 |
| 9 | NiS (10) |   | 34.2 | 49 |
|   |   | $Mg(VO_3)_2$ (10) | 30.9 | 54 |
|   | NiS (5) | $Mg(VO_3)_2$ (5) | 29.8 | 56 |
| 10 | $Ni_2Si$ (10) |   | 58.5 | 13 |
|   |   | $V_2O_5$ (10) | 23.7 | 65 |
|   | $Ni_2Si$ (5) | $V_2O_5$ (5) | 20.8 | 69 |
| 11 | Nickel Stearate (10) |   | 64.0 | 5 |
|   |   | $NaVO_3$ (10) | 38.1 | 43 |
|   | Nickel Stearate (5) | $NaVO_3$ (5) | 15.8 | 77 |

These results demonstrate that the defined additive mixtures substantially reduce smoke evolution during forced burning of rigid polyvinyl chloride in the Goodrich Smoke-Char Test. The results also demonstrate the smoke retardant effects of individual additives in the same test.

The improved smoke retardant vinyl chloride and vinylidene chloride polymer compositions of this invention are useful wherever smoke resistance is desirable, such as in carpets, house siding, plastic components for airplane interiors, and the like. Of course, overall suitability for a particular use may depend upon other factors as well, such as comonomer type and level, compounding ingredient type and level, polymer particle size and the like.

I claim:

1. A smoke retardant composition comprising a vinyl chloride or vinylidene chloride polymer together with (A) at least one nickel compound selected from the group consisting of $NiCO_3$, NiO, $Ni_2Si$, and nickel stearate and (B) at least one vanadium compound selected from the group consisting of $NH_4VO_3$, $Mg(VO_3)_2$, $NaVO_3$, $VOSO_4$, $V_2O_5$, and vanadium oxyacetylacetonate, said compounds (A) and (B) being compounds or hydrates thereof, and said compounds (A) and (B) being present in a total amount from about 0.25 to about 20 weight parts per 100 weight parts of polymer.

2. A composition of claim 1 wherein said polymer contains copolymerized therewith up to about 50% by weight of at least one other olefinically unsaturated monomer.

3. A composition of claim 2 wherein said polymer contains copolymerized therewith up to about 20% by weight of said other monomer.

4. A composition of claim 3 wherein said other monomer is selected from the group consisting of 1-olefins containing from 2 to 12 carbon atoms, vinyl esters, α,β-olefinically unsaturated carboxylic acids and esters thereof, amides of α,β-olefinically unsaturated carboxylic acids, and esters of fumaric and maleic acid.

5. A composition of claim 4 wherein said compound has an average particle size from about 0.1 to about 200 microns.

6. A composition of claim 4 wherein said compound (A) is $NiCO_3$ and said compound (B) is $V_2O_4$.

7. A composition of claim 4 wherein said compound (A) is NiO and said compound (B) is $NH_4VO_3$.

8. A composition of claim 4 wherein said compound (A) is NiO and said compound (B) is $Mg(VO_3)_2$.

9. A composition of claim 4 wherein said compound (A) is NiO and said compound (B) is $NaVO_3$.

10. A composition of claim 4 wherein said compound (A) is NiO and said compound (B) is $VOSO_4·2H_2O$.

11. A composition of claim 4 wherein said compound (A) is NiO and said compound (B) is $V_2O_4$.

12. A composition of claim 4 wherein said compound (A) is NiO and said compound (B) is $V_2O_5$.

13. A composition of claim 4 wherein said compound (A) is NiO and said compound (B) is vanadium oxyacetylacetonate.

14. A composition of claim 4 wherein said compound (A) is NiS and said compound (B) is $Mg(VO_3)_2$.

15. A composition of claim 4 wherein said compound (A) is $Ni_2Si$ and said compound (B) is $V_2O_5$.

16. A composition of claim 4 wherein said compound (A) is nickel stearate and said compound (B) is $NaVO_3$.

17. A smoke retardant composition comprising a vinyl chloride or vinylidene chloride polymer together with at least one compound selected from the group consisting of $Mg(VO_3)_2$, $NaVO_3$, and hydrates thereof, said compound being present in a total amount from about 0.25 to about 20 weight parts per 100 weight parts of polymer.

18. A composition of claim 17 wherein said polymer contains copolymerized therewith up to about 50% by weight of at least one other olefinically unsaturated monomer.

19. A composition of claim 18 wherein said polymer contains copolymerized therewith up to about 20% by weight of said other monomer.

20. A composition of claim 19 wherein said other monomer is selected from the group consisting of 1-olefins containing from 2 to 12 carbon atoms, vinyl esters, α,β-olefinically unsaturated carboxylic acids and esters thereof, amides of α,β-olefinically unsaturated carboxylic acids, and esters of fumaric and maleic acid.

21. A composition of claim 20 wherein said compound has an average particle size from about 0.1 to about 200 microns.

22. A composition of claim 20 wherein said compound is $Mg(VO_3)_2$.

23. A composition of claim 20 wherein said compound is $NaVO_3$.

* * * * *